US006567868B1

(12) United States Patent
Tran et al.

(10) Patent No.: US 6,567,868 B1
(45) Date of Patent: May 20, 2003

(54) STRUCTURE AND METHOD FOR AUTOMATICALLY SETTING THE CPU SPEED

(75) Inventors: Robin T. Tran, Houston, TX (US); Michael R. Durham, Houston, TX (US); Mark A. Piwonka, Tomball, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/561,430

(22) Filed: Apr. 28, 2000

(51) Int. Cl.[7] .......................... G06F 13/372; G06F 1/04
(52) U.S. Cl. ........................ 710/60; 710/19; 710/58; 710/267; 713/500; 713/501; 713/503
(58) Field of Search .......................... 710/60, 58, 267, 710/19; 713/500, 501, 503

(56) References Cited

U.S. PATENT DOCUMENTS 5,394,217 A * 2/1995 Gaboury et al. ............ 356/218
5,951,681 A * 9/1999 Chang .......................... 713/1
6,035,358 A * 3/2000 Tanikawa ................... 710/310
6,148,397 A * 11/2000 Chang .......................... 713/1
6,397,343 B1 * 5/2002 Williams et al. ............ 713/501

* cited by examiner

Primary Examiner—Jeffrey Gaffin
Assistant Examiner—Rehana Perveen

(57) ABSTRACT

The preferred embodiment of the invention has a combination of a detection circuit and executable software. The detection circuit is capable of detecting the removal and replacement of a computer system microprocessor and latching an indication that the microprocessor has been removed, even if that removal has taken place while the computer system is without power. Having latched an indication that the microprocessor has been removed and replaced, the detection circuit asserts appropriate signals to start the microprocessor in a safe mode. Once operating in a safe mode, an executable program polls the latched indication, and if the indication is that the CPU has been removed and replaced, the software is further adapted to prompt a computer system user for a new host bus to CPU core speed ratio and modify registers to indicate a new value, if necessary, that are subsequently used to start the CPU at the correct operational speed.

9 Claims, 2 Drawing Sheets

STRUCTURE AND METHOD FOR AUTOMATICALLY SETTING THE CPU SPEED

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to setting the speed of a central processing unit in a computer system. More specifically, the invention relates to detecting whether the computer system central processing unit has changed, and if so, prompting the computer system user to enter a correct processing unit speed.

2. Background of the Invention

In the early days of computer system technology, motherboards (which are the main circuit boards in computers on which most of the core electronics are mounted) were built for use with a particular central processing unit (CPU). In some instances in early computers, the CPU was hard-wired or soldered to the motherboard such that it was not easily removable. As computer system technology advanced, motherboard manufacturers began to design motherboards that could be used with different central processing units. In this way, the manufacturer could support multiple types of CPUs with a single motherboard to aid in keeping the manufacturer competitive.

Different CPUs each may operate at different speeds. The speed of operation of a CPU is termed its "frequency" and is determined by a clock signal provided to it. The clock signal is a periodic signal that transitions through many cycles each second. For example, a 500 MHz clock signal transitions through 500 million periodic cycles each second. The clock signal provided to the CPU typically is generated by specialized devices separate from the CPU and routed to the CPU chip via a conductive trace on the computer's motherboard. In making a motherboard capable of supporting various types of CPUs, each motherboard manufacturer had to address supporting CPUs having different operational speeds. In supporting CPUs having various operational speeds, some mechanism had to exist to modify operation of the motherboard such that it clocked the CPU at the proper speed. Early implementations used jumpers or dip switches to indicate to the motherboard which CPU was in place, and at what speed the CPU was to operate. These jumpers or dip switches may have set or changed voltage levels or may have controlled or set clock frequency.

The "host" bus generally is the bus which couples the CPU to other devices in the computer and across which the CPU communicates. One of the signals comprising the host bus is a clock signal, and the CPU uses that clock signal for its own use to generate a clock signal to operate the CPU's core logic (or simply "core"). With advancement in microprocessor technology, the microprocessors themselves became capable of specifying the frequency of the clock signal for the host bus. However, a second set of parameters was established which determined the speed at which the CPU core was clocked. More specifically, the second set of parameters determined the ratio of the clock frequency of the host bus to the core operating frequency of the CPU. The ratio thus specified how fast the core of the CPU should be clocked relative to the clock frequency of the host bus For example, if the host bus speed was 66 MHz, and the host bus to core ratio was ⅙, the processor core operated at 400 MHz. Jumpers and dip switches used by prior art devices set this host bus to core frequency ratio. FIG. 1 shows one prior art structure for setting the host bus to CPU core frequency ratio. Shown in FIG. 1 is a multiplexer 10 located between a CPU 12 and bridge device 14. The multiplexer 10 connects either the four signal lines 11 from the bridge 14, or the four signal lines 17 from the switch bank 16, to the four lines 13 routed to the CPU 12. In normal operation, the bridge device 14 communicated directly with the CPU 12, across the four signal lines 11 to perform functions other than setting the host bus to CPU core frequency ratio. However, during power up, it was necessary to selectively assert lines 13 to indicate to the CPU the correct host bus-to-core speed ratio. As indicated in FIG. 1, this was accomplished by having the switch bank 16, which possibly comprised dip switches or jumpers, connected to the multiplexer 10 such that during the power up procedure, the multiplexer coupled signals 17 from the switch bank 16 to the CPU 12. At this point during power up, the state of signals 17/13 indicated the desired clock frequency ratio. After informing the CPU 12 of its correct host bus-to-CPU core frequency, the multiplexer 10 shifted back to coupling the four output signal lines from the bridge 14 to the CPU 12 for normal operation.

The next development in setting the host bus-to-CPU core frequency ratio came with a chip-set manufactured by Intel™ Corporation. Intel™ effectively replaced the switch bank 16 and multiplexer 10 with registers in the Intel™ Input/Output Controller Hub ("ICH"), the equivalent of the bridge device 14. Rather than have a switch bank 16, strap registers existed within the ICH which coupled to the CPU 12 through a multiplexer, or its equivalent, that was internal to the ICH. In this way, the same functionality was accomplished, yet that functionality was contained within the ICH. However, by placing the switch bank and multiplexers within Intel's bridge device, this effectively removed the mechanism for a person working on the computer system to inform the motherboard of a change of the CPU. Consequently, the working CPU could change, but the indication of host-to-core frequency in the bridge device still reflect old values. This could lead to processing errors if the new CPU is operated beyond its functional limits or non-optimum performance if the CPU is operated below its rated maximum.

It would be desirable to detect when the computer system's CPU has been removed and replaced. Further, it would be desirable to provide a convenient mechanism by which the contents of the strap registers may be changed responsive to removal and replacement of the computer system's CPU.

BRIEF SUMMARY OF THE INVENTION

The problems noted above are solved in large part by a detection circuit that can detect when the CPU of a computer system has been removed, even if that removal occurs during a time when the computer system is powered off. The detection circuit comprises a pull-up resistor connected on one side to a battery voltage and on its other side to both a grounded pin of the CPU as well as an input signal line of a super input/output (I/O) controller. When the CPU is in place, the grounded pin of the CPU effectively grounds a side of the pull-up resistor opposite that of the battery.

However, when the CPU is removed, the CPU side of the resistor rises in voltage to a level that approaches that of the battery. When this high voltage condition occurs, the super I/O controller latches an indication that the CPU has been removed.

Upon subsequent power up, the super I/O controller indicates to a bridge logic device, which may comprise an I/O controller hub (ICH), that the computer system CPU has changed since the last operation. In response, the ICH operates the CPU at a reduced, default frequency to ensure correct operation. Software executed during the power on self test (POST) procedure prompts the computer system user for a correct host bus to core frequency ratio. Once entered, the software writes the new value, if required, to strap registers in the ICH and then reboots the computer. Upon the next power up procedure, the correct host bus to CPU operating frequency is passed to the CPU for correct operation.

Thus, the preferred embodiment of the invention addresses the problem that arises when a CPU is replaced in a computer system where the host-to-core frequency ratio is set otherwise automatically by an ICH. If the system is unable to detect a change of the CPU, which is the case in the prior art, then the possibility exists that strap registers in the ICH may not reflect the true host-to-core ratio.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

Throughout this specification the term "CPU speed" and "host bus to core frequency ratio" are used interchangeably. Properly speaking, modem CPUs do not actually set a CPU clock frequency; but rather, the host bus frequency is set and then the CPU core is clocked at some ratio relative to that host bus frequency. Thus, using the term CPU speed should be considered as equivalent to saying host bus to CPU core frequency ratio.

DETAILED DESCRIPTION OF THE PREFERRED EMBODIMENTS

Figure 2:
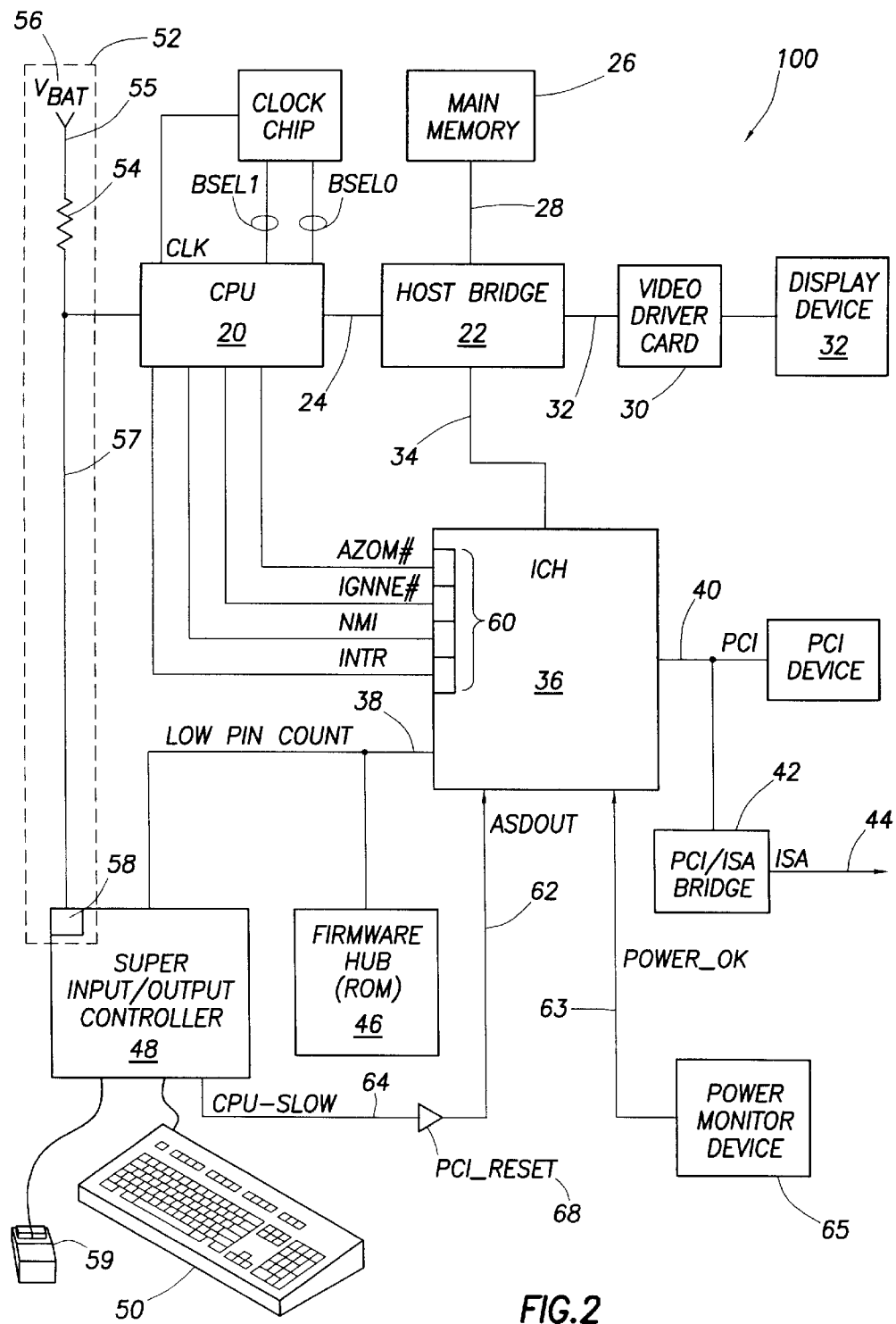
FIG. 2 shows an exemplary implementation of the preferred embodiment of a mechanism to set the host bus-to-core frequency ratio in a computer system.

FIG. 2 illustrates a computer system 100 constructed in accordance with the preferred embodiment. Computer system 100 generally comprises a microprocessor or CPU 20 coupled to a main memory 26 and various other peripheral computer system components, through an integrated host bridge 22. The CPU 20 preferably couples to the host bridge 22 via a host bus 24, or the host bridge logic 22 may be integrated into the CPU 20. The CPU 20 may comprise, for example, a Pentium® III microprocessor. It should be understood, however, that computer system 100 could include other microprocessors if the host bus to core frequency of those alternative processors can be set in a similar fashion to that described below. Thus, the computer system may implement other bus configurations or bus bridges in addition to, or in place of, those shown in FIG. 2.

Main memory 26 preferably couples to the host bridge 22 through a memory bus 28. The host bridge 22 preferably includes a memory control unit (not shown) that controls transactions to the main memory 26 by asserting the necessary control signals during memory accesses. The main memory 26 functions as the working memory for the CPU 20 and generally includes a conventional memory device or array of memory devices in which programs, instructions and data are stored. The main memory 26 may comprise any suitable type of memory such as dynamic random access memory (DRAM) or any of the various types of DRAM devices such as synchronous DRAM (SDRAM), extended data output DRAM (EDO DRAM), or Rambus™ DRAM (RDRAM).

The computer system 100 also preferably includes a graphics controller or video driver card 30 that couples to the host bridge 22 via an Advanced Graphics Port ("AGP") bus 32, or other suitable type of bus. Alternatively, the video driver card may couple to the primary expansion bus 34 or one of the secondary expansion buses, for example, PCI bus 40. Graphics controller 30 further couples to a display device 32 which may comprise any suitable electronic display device upon which any image or text can be represented.

The computer system 100 also preferably comprises another bridge logic device 36 that bridges the primary expansion bus 34 to various secondary buses including a low pin count (LPC) bus 38 and a peripheral component interconnect ("PCI") bus 40. In accordance with the preferred embodiment, the bridge device 36 includes the Input/Output Controller Hub ("ICH"), model 82801AA manufactured by Intel Corporation. Although the ICH is shown in FIG. 2 only to support the LPC bus 38 and PCI bus 40, various other secondary buses may be supported by the ICH 36.

In the preferred embodiment shown in FIG. 2, the primary expansion bus 34 comprises a Hub-link bus which is a proprietary bus of Intel™ Corp. However, computer system 100 is not limited to any particular type of primary expansion bus, and thus other suitable buses may be used. Industry Standard Architecture (ISA) bus 44 is shown in the preferred embodiment coupled to the ICH 36 by way of a PCI-to-ISA bridge device 42.

Referring still to FIG. 2, a firmware hub 46 couples to the ICH 36 by way of the LPC bus 38. The firmware hub 46 preferably comprises read only memory (ROM) which contains software programs executable by the CPU 20. The software programs preferably include not only programs to implement basic input/output system (BIOS) commands, but also include instructions executed during and just after power on self test (POST) procedures. These software programs perform various functions including verifying proper operation of various system components before control of the system is turned over to the operating system.

A super Input/Output controller 48 couples to the ICH 36 and controls many computer system functions including interfacing with various input and output storage devices such as keyboard 50. The super I/O controller 48 may further interface, for example, with a system pointing device such as mouse 59, various serial ports (not shown) and floppy drives (not shown). The super I/O controller 48 is often referred to as "super" because of the many I/O functions it may perform.

The preferred embodiment of this invention has two major components: 1) a detection circuit capable of detecting when the computer system CPU has been removed; and 2) a system related to the detection circuit that, when necessary, prompts the computer system user for a correct CPU speed and correspondingly updates strap registers in the ICH 36 to indicate the new computer speed, as needed.

FIG. 2 shows the preferred detection circuit 52 which comprises a combination of discrete components on the motherboard and functionality embodied in the super I/O controller 48 as indicated. The primary component of the detection circuit preferably is a pull-up resistor 54 which couples on one side 55 to a voltage source 56. This voltage source is preferably a battery residing somewhere in the computer system. By coupling the pull-up resistor 54 to the battery 56 in this manner, the detection circuit is capable of detecting the removal of the computer system's CPU, even when the AC power to the system is turned off. The second side 57 of the pull-up resistor 54 is preferably coupled to both the CPU 20 and the super I/O controller 48. If the CPU 20 is a Pentium III processor, this connection to the CPU is made to the CPU's CPU_PRSNT_pin, or the equivalent if a different CPU is used. This is a pin of the CPU 20 that is grounded such that when the CPU is properly installed, current is allowed to flow from the battery 56 through the pull-up resistor 54 and then to ground or common through the identified pin. Thus, when the CPU 20 is present the voltage on side 57 of the pull-up resistor 54 will be approximately ground or common. It will be understood that the CPU_PRSNT_pin is not itself the ground for the CPU; but rather, is coupled physically within the CPU to another pin of the CPU that couples to system ground or common.

Correspondingly, when the CPU 20 is removed, independent of whether or not the computer system is powered up, voltage on side 57 of the pull-up resistor 54 tends to approach the voltage of the battery 56. Indeed, if there is no current flow through the connection to the super I/O controller 48, the voltage on the CPU side 57 of the pull-up resistor equals the battery voltage. Thus, the presence or absence of the computer system's CPU causes a low or high voltage respectively on the CPU side 57 of the pull-up resistor 54. Super I/O controller 48 senses the voltage on the CPU side of the pull-up resistor 54. When this voltage reaches a high state, indicating that the CPU had been removed, the super I/O controller 48 sets a bit in a status bit register 58 in the super I/O controller. This bit indicates whether the CPU 20 is present. Setting the bit preferable indicates the CPU has been removed and possible replaced, and clearing the bit indicates the CPU has not been removed, or vice-versa. In this way, the status bit register 58 in the super I/O controller 48 holds an indication that the CPU has been removed, even if the same or different CPU is placed back on the motherboard. Thus, the combination of the battery 56, pull-up resistor 54, grounded pin of the CPU and status register bit 58 in the super I/O controller 48 forms a means for detecting when the CPU has been removed.

Although the status bit register has been described as being located in the super I/O controller 48, this particular register could be located anywhere within the computer system. For example, the register may be implemented in discrete logic on the motherboard, or placed within various other components of the computer system including the ICH 36. The super I/O controller 48 could be, for example, an SMSC LTC47B347. Preferably the register is located in any computer system component that remains powered when the AC power is removed. A battery may provide power to these components that stay powered after removal of the AC power. This batter may be battery 56 shown in FIG. 2, or may be a separate battery.

Detecting that the CPU 20 has been removed is only part of the process of automatically setting the CPU speed. When a different CPU is inserted on the motherboard, it may be possible that strap register 60 contained in the ICH 36, which indicate, based on their asserted or not asserted condition, the host bus-to-CPU core frequency ratio, may not reflect a correct ratio for the newly inserted CPU 20. In this regard, it is possible that the new CPU may not be operated to its full potential by being internally clocked at less than its optimum operating frequency, or it may be possible that the frequency strap register contain values which clock the CPU at speeds faster than the CPU is capable of correctly sustaining, thus causing computational errors. Accordingly, once the detection circuit detects that the CPU 20 has been removed and replaced, some mechanism must exist to correct the host bus-to-CPU core frequency value in the strap register 60, as necessary.

The first step in correcting the values contained in strap register to correctly reflect the actual CPU core frequency ratio involves starting the CPU 20 in a default safe mode. That is, when the detection circuit 52 detects that the CPU has been removed, the next power up operation of the CPU must be done at some speed slow enough to ensure that any CPU 20 which physically fits on the computer system motherboard correctly operates. Thus, in this safe mode of operation, the ICH 36 sets the host bus to CPU core speed ratio at some level slow enough for correct operation of applicable CPUs. One of ordinary skill in the art will readily be able to determine such a safe ratio given the currently available CPUs, their operating frequencies, and the frequency of the host bus.

The ICH 36 makes this safe mode start based on the assertion of its input signal ASDOUT 62. Much like the dual purpose signal lines that the CPU 20 reads on the rising edge of the reset signal as discussed above, the ASDOUT 62 signal performs a dual function. On the rising edge of POWER_OK 63, which is asserted by a power monitoring device 65 such as the MAXIM 6811, the ASDOUT signal line is read as an indication of a need to start the CPU 20 in a safe mode. Thus, as shown in FIG. 2, the super I/O controller 48 preferably asserts a CPU_SLOW 64 signal to buffer 68 only if the CPU has been removed since the last operation of the computer system. At system startup the CPU_SLOW signal 64 is asserted to the ASDOUT signal 62 by way of buffer 68 if the CPU 20 has been replaced, thus informing the ICH 36 that the CPU 20 should be operated in a safe mode. If the CPU 20 was not removed since the last operation, the super I/O controller does not assert the CPU_SLOW signal 64. Although the buffer 68 is shown as a component external to both the super I/O controller 48 and the ICH 36, it will be understood that this component can be either a discrete component, as shown, or implemented within logic generally in any suitable device in computer system 100. Thus, using the detection circuit 52 in combination with super I/O controller 48, the computer system 100 detects when CPU 20 has been replaced. To ensure correct operation when this condition is detected, the ICH 36 causes the computer to boot into a safe mode of operation.

Figure 1:
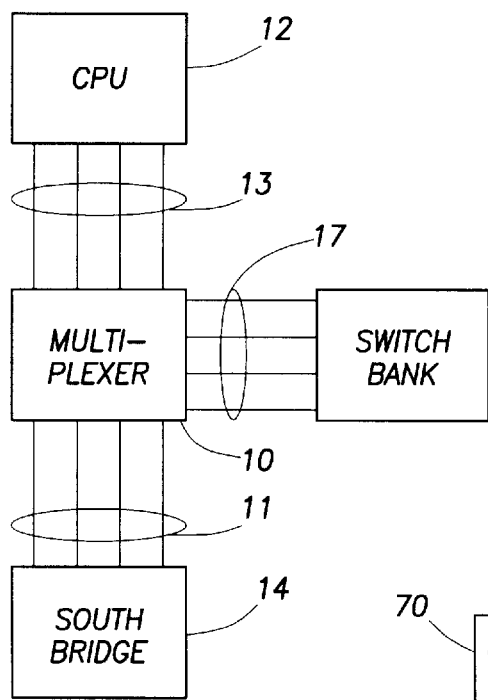
FIG. 1 shows a prior art structure for setting the host bus-to-CPU core frequency ratio.
Figure 3:
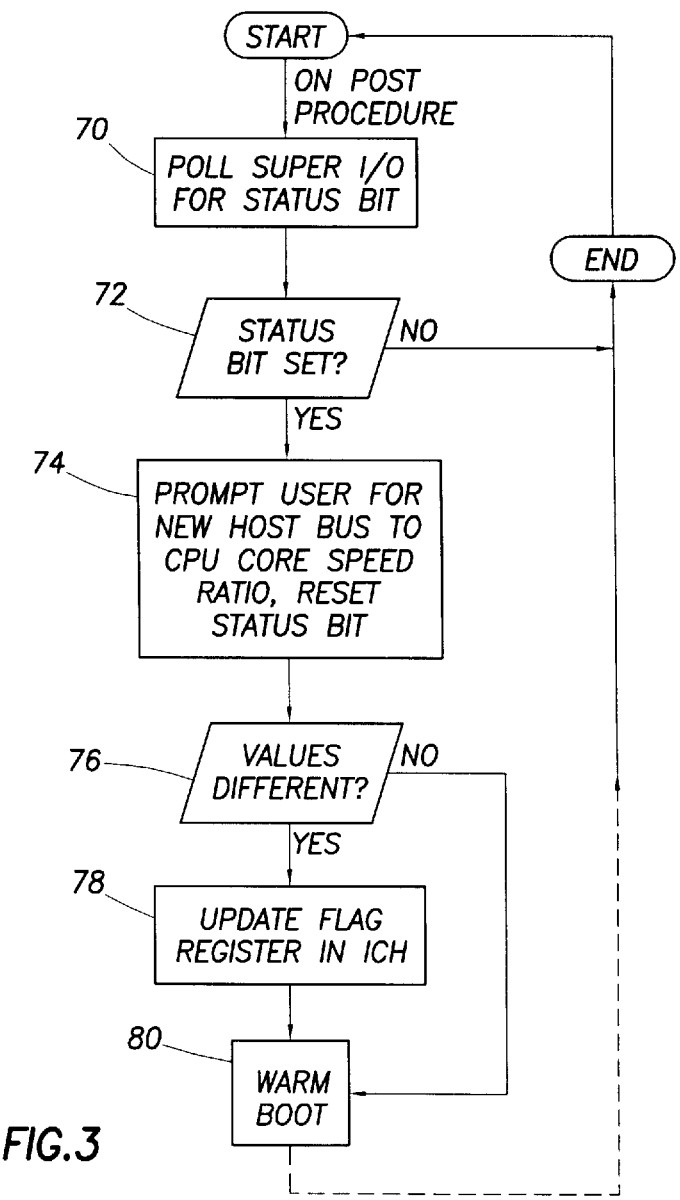
FIG. 3 shows a flow diagram of a strap register update process performed during POST in the computer system of FIG. 2.

As indicated above, the second major function of the preferred embodiment is prompting a computer system user for a new host bus-to-CPU core speed ratio when the CPU has been replaced as detected by the detection circuit 52. Referring to FIG. 3, this is preferably accomplished by a program contained on the firmware hub 46 and executed by the CPU 20. This program is executed by the CPU 20 during the power on self test (POST) procedure. This program preferably polls the value contained in the status register bit 58 within the super I/O controller 48 at block 70. If at block 72 the status register bit is asserted, indicating that the CPU 20 has been removed since the last power up cycle, the software preferably prompts at block 74 a computer system user, by means of the display device 32, to enter a new CPU speed via the keyboard 50. The program further resets the status bit as indicated in block 74. The executable program preferably compares at block 76 the value entered to the value represented by the strap register 60 in the ICH 36. If the value entered by the computer system user is different than the value represented by the strap register 60, the executable program preferably changes or writes the new values into the strap register 60 as indicated at block 78. If the value entered by the computer system user is the same as the value represented by the strap register 60, no writing or changing of the strap register 60 is required. Finally, the executable program preferably warm boots the system at block 80 and the process starts again. However, assuming that the CPU has not again been removed, the detection circuit will not latch an asserted state and therefore during the subsequent POST procedure the executable program will not need to prompt the computer system user for additional information. Procedures at that point continue as normal with the CPU operating at the speed as entered by the user.

The above discussion is meant to be illustrative of the principles and various embodiments of the present invention. Numerous variations and modifications will become apparent to those skilled in the art once the above disclosure is fully appreciated. For example, the description of the preferred embodiment above uses a pull-up resistor and modifications to super I/O controller to latch an asserted state based on a high voltage on a CPU side of the pull-up resistor. However, any form of detection circuit capable of detecting that the CPU has been removed is within the contemplation of this invention. Further, the status bit 58 is disclosed to reside within the super I/O controller 58. However, placement of this particular register could be in any available component of the motherboard or may be implemented in discrete logic, and still be within the contemplation of this invention.

What is claimed is:

1. A computer system, comprising:
    a CPU;
    a main memory coupled to the CPU via a host bridge logic device;
    a display device coupled to said host bridge logic device;
    an I/O controller hub (ICH) coupled to said host bridge by way of a primary expansion bus; and
    a detection circuit coupled to said ICH, said detection circuit adapted to monitor the presence of said CPU and assert a status bit in a status register if said CPU has been removed;
    wherein said status bit register of said detection circuit is contained in an input/output controller coupled to said ICH via a secondary expansion bus.

2. The structure as defined in claim 1 wherein said secondary expansion bus comprises a Low Pin Count (LPC) bus.

3. A computer system, comprising:
    a CPU;
    a main memory coupled to the CPU via a host bridge logic device;
    a display device coupled to said host bridge logic device;
    an I/O controller hub (ICH) coupled to said host bridge by way of a primary expansion bus; and
    a detection circuit coupled to said ICH, said detection circuit adapted to monitor the presence of said CPU and assert a status bit in a status register if said CPU has been removed;
    said ICH has an input signal line that, when asserted, starts the computer system in a safe mode of operation to ensure proper operation of the CPU; and
    said status bit register is coupled to said input signal line of said ICH such that when said status bit register is asserted said ICH starts the computer in said safe mode.

4. The structure as defined in claim 3 further comprising:
    a keyboard coupled to said ICH;
    a firmware hub containing a software program executed during power on self test (POST) operations;
    said ICH having a strap register that holds a value that represents a current host bus to CPU core speed ratio;
    said software program adapted to poll said status bit register in the detection circuit to determine if said CPU has been removed;
    said software program further adapted to prompt a computer system user to enter a correct host bus to CPU core speed ratio if said status bit is asserted, said software further adapted to adjust the strap register in the ICH to reflect the new host bus to core speed ratio.

5. The structure as defined in claim 4 wherein said detection circuit further comprises:
    a pull-up resistor coupled to a battery on one side;
    said status bit register and said CPU coupled to the other side of said pull-up resistor, said status bit register adapted to become asserted when said CPU is removed.

6. The structure as defined in claim 5 wherein said status bit register in an input/output controller coupled to said ICH via a secondary expansion bus.

7. The structure as defined in claim 6 where said secondary expansion bus comprises a Low Pin Count (LPC) bus.

8. A system for automatically setting a speed of a CPU in a computer system comprising:
    a detection circuit coupled to the CPU adapted to determine when the CPU has been replaced, wherein said detection circuit further comprises:
        a pull-up resistor coupled on one side to a battery and on a second side to a grounded pin of said CPU such that when said CPU is inserted, the second side of said pull-up resistor is grounded, and when said CPU is removed, the second side of said pull-up resistor has a high voltage; and said second side of said pull-up resistor further coupled to a status bit register adapted to latch an asserted state when said CPU side of the pull-up resistor has a high voltage indicating the CPU has been replaced;

a bridge logic unit coupled to said detection circuit and said CPU, said bridge logic unit adapted to operate the CPU in a safe mode responsive to the detection circuit's determination that the CPU has been replaced; and an executable program contained in a read only memory (ROM) coupled to the bridge logic unit, said executable program adapted to communicate with said detection circuit, and if the detection circuit indicates the CPU has been replaced, said executable program adapted to communicate with the computer system user to retrieve a new CPU speed;

said status bit register in an input/output controller; and said input/output controller coupled to said bridge logic unit.

9. The structure as defined in claim 8 wherein said executable program polls said status bit register and, if said status bit register is asserted, prompts a computer user for a correct CPU speed and sets strap registers in said bridge logic unit to indicate a correct speed of the CPU.

\* \* \* \* \*